United States Patent [19]

Küchler et al.

[11] 4,385,139

[45] May 24, 1983

[54] SYNTHETIC RESIN COMPOSITION, PROCESS FOR ITS PREPARATION, ITS USE AND SHEET MADE OF SAID COMPOSITION

[75] Inventors: Manfred Küchler, Oberursel; Günther Duve; Joachim Ebigt, both of Frankfurt am Main, all of Fed. Rep. of Germany

[73] Assignee: Hoechst Aktiengesellschaft, Frankfurt am Main, Fed. Rep. of Germany

[21] Appl. No.: 310,074

[22] Filed: Oct. 9, 1981

[30] Foreign Application Priority Data

Oct. 11, 1980 [DE] Fed. Rep. of Germany ....... 3038471

[51] Int. Cl.³ ........................ C08L 29/02; C08L 31/02
[52] U.S. Cl. .................................... 523/437; 264/175; 264/176 R; 264/211; 524/381; 524/382; 524/425; 524/521; 525/119; 525/218
[58] Field of Search ................ 523/437; 524/381, 382, 524/521; 525/218, 119; 264/175, 176 R

[56] References Cited

U.S. PATENT DOCUMENTS

| | | | |
|---|---|---|---|
| 3,271,188 | 9/1966 | Albert et al. | 428/463 |
| 3,554,855 | 1/1971 | Oberst et al. | 523/437 |
| 3,594,337 | 7/1971 | Shea | 524/521 |
| 4,048,136 | 9/1977 | Kobayashi et al. | 524/521 |

*Primary Examiner*—Lewis T. Jacobs
*Attorney, Agent, or Firm*—Curtis, Morris & Safford

[57] ABSTRACT

A synthetic resin composition is prepared by mixing various polymers which differ, above all, in their second order transition temperature; the composition can also contain a filler, an epoxide resin and an alcoholate. The composition is preferably obtained in the form of granules, the particle diameter being within the range from 1 to 10 mm. It is used as a starting material for the production of vibration-damping sheets.

8 Claims, No Drawings

SYNTHETIC RESIN COMPOSITION, PROCESS FOR ITS PREPARATION, ITS USE AND SHEET MADE OF SAID COMPOSITION

The invention relates to a synthetic resin composition composed of at least two different polymers and a filler, and to a process for its preparation, to its use as a starting material for vibration-damping sheets and to sheets made of the synthetic resin composition.

It is known that both copolymers and mixtures of polymers are suitable for the production of vibration-damping sheets; mixtures consisting of polystyrene and polymethyl methacrylate, of polystyrene and a styrene/methyl acrylate copolymer and of polymethyl methacrylate and polyvinyl acetate have been investigated particularly (cf. Kolloid - Zeitschrift, volume 148 (1956), pages 57 et seq).

It is also known that fillers affect the sound-absorbing action of sound-deadening compositions containing, as a binder, an acrylate copolymer, a polyvinyl propionate or a plasticised polyvinyl acetate; fillers such as vermiculite, mica, graphite, kaolin, china clay, feldspar, talc, asbestos, carbon black, barium sulfate and perlite are employed in this connection, in each case in a quantity of up to 40 percent (cf. Kunststoffe, volume 50 (1960), pages 606 et seq).

An important criterion for the applicability of vibration-damping materials for damping the bending vibration of rigid panels, particularly of metal sheets in sheet-metal structures of vehicles of all kinds and also in machines, appliances and components, is the width of the temperature range of the damping, which, in most industrial applications of damping materials, is chiefly of interest for the frequency range between 100 and 1,000 Hertz (cf. Kolloid - Zeitschrift, volume 216–217 (1967), pages 64 et seq).

The object of the invention is to provide a thermoplastic material suitable for the production of sheets which ensures vibration-damping within as wide a temperature range as possible.

The invention relates, therefore, to a synthetic resin composition comprising (a) 10 to 90 percent by weight of a copolymer composed of at least one acrylic acid alkyl ester having 4 to 10 carbon atoms in the alkyl radical, a methacrylic acid alkyl ester having 1, 2 or 3 carbon atoms in the alkyl radical, an amide of an unsaturated monocarboxylic acid having 3, 4 or 5 carbon atoms, and, if appropriate, an unsaturated monocarboxylic acid having 3, 4 or 5 carbon atoms, (b) 90 to 10 percent by weight of at least one polymer of a vinyl ester having 4, 5 or 6 carbon atoms, (c) 0 to 80 percent by weight of an inorganic filler, (d) 0 to 10 percent by weight of an epoxide resin having an average epoxide equivalent weight of 100 to 5,000 and (e) 0 to 10 percent by weight of an alcoholate of a bivalent, trivalent or tetravalent metal, the quantity of the components (c), (d) and (e) being in each case related to the total of the components (a)+(b)+(c).

The invention also relates to a process for the preparation of a synthetic resin composition, which comprises thoroughly mixing together, at a temperature of 150° to 180° C. for a period of 10 to 30 minutes in a kneader, (a) 10 to 90 parts by weight of a copolymer composed of at least one acrylic acid alkyl ester having 4 to 10 carbon atoms in the alkyl radical, a methacrylic acid alkyl ester having 1, 2 or 3 carbon atoms in the alkyl radical, an amide of an unsaturated monocarboxylic acid having 3, 4 or 5 carbon atoms, and, if appropriate, an unsaturated monocarboxylic acid having 3, 4 or 5 carbon atoms, (b) 90 to 10 parts by weight of at least one polymer of a vinyl ester having 4, 5 or 6 carbon atoms, (c) 0 to 80 parts by weight of an inorganic filler, (d) 0 to 10 parts by weight of an epoxide resin having an average epoxide equivalent weight of 100 to 5,000 and (e) 0 to 10 parts by weight of an alcoholate of a bivalent, trivalent or tetravalent metal, the total of the components (a)+(b)+(c) amounting to 100 parts by weight, and then discharging the mixture in the form of particles having an average particle diameter of 1 to 10 mm.

The invention also relates to the use of the abovementioned synthetic resin composition as the starting material for the production of vibration-damping sheets and to the sheets made of the synthetic resin composition.

The synthetic resin composition according to the invention is preferably composed of 20 to 80 percent by weight of the component (a), 80 to 20 percent by weight of the component (b), 60 to 80 percent by weight of the component (c), 0 to 6 percent by weight of the component (d) and 0 to 6 percent by weight of the component (e), the quantity of the components (c), (d) and (e) being related in each case to the total of the components (a)+(b)+(c).

The main constituent of the synthetic resin composition according to the invention is a mixture of at least two polymers differing in type and properties. Whereas a copolymer which is composed of at least three monomers and which has a second order transition temperature not higher than −10° C., is employed as component (a), a vinyl ester polymer having a second order transition temperature not lower than +5° C. is used as component (b). A mixture of the components (a) and (b), in which the second order transition temperatures differ by at least 20° C., is particularly advantageous. The second order transition temperature of the component (a) is preferably within the range from −50° to −10° C., and the second order transition temperature of the component (b) is 5° to 50° C., preferably 10° to 35° C.

The component (a) is a copolymer composed of at least one acrylic acid alkyl ester, preferably two or three acrylic acid alkyl esters, having in each case 4 to 10 carbon atoms, preferably 4 to 8 carbon atoms, in the alkyl radical, and of a methacrylic acid alkyl ester having 1, 2 or 3 carbon atoms in the alkyl radical, an amide of an unsaturated monocarboxylic acid having 3, 4 or 5 carbon atoms, and, if appropriate, an unsaturated monocarboxylic acid having 3, 4 or 5 carbon atoms, The copolymer is prepared by polymerising, under customary conditions, a mixture composed of 70 to 85 percent by weight, preferably 75 to 82 percent by weight, of the acrylic acid alkyl ester(s), 5 to 20 percent by weight, preferably 8 to 17 percent by weight, of the methacrylic acid alkyl ester, 3 to 10 percent by weight, preferably 4 to 8 percent by weight, of the amide and 0 to 5 percent by weight, preferably 0.4 to 3 percent by weight, of the monocarboxylic acid. The viscosity of the copolymer is within the range from 20 to 80 Pa·s, preferably 35 to 50

Pa·s (determined in the melt at a temperature of 180° C.).

The acrylic acid alkyl esters used are acrylic acid esters having a linear or branched alkyl radical, for example acrylic acid butyl ester, acrylic acid pentyl ester, acrylic acid hexyl ester, acrylic acid octyl ester, acrylic acid t.-butyl ester, acrylic acid amyl ester, acrylic acid t.-amyl ester, acrylic acid 2,2-dimethylbutyl ester, acrylic acid 3,3-dimethylbutyl ester and acrylic acid 4-ethylhexyl ester. Suitable methacrylic acid alkyl esters are methacrylic acid methyl ester, ethyl ester and propyl ester, and suitable amides are, in particular, acrylamide, methacrylamide, crotonamide and vinylacetamide. The monocarboxylic acid employed is, in particular, acrylic acid, methacrylic acid, crotonic acid or vinylacetic acid.

The component (b) is a polymer of a vinyl ester which has 4, 5 or 6 carbon atoms and which is prepared under customary conditions by polymerising vinylacetate, vinylpropionate or vinylbutyrate, if appropriate in combination with a maleic acid dialkyl ester or fumaric acid dialkyl ester, each of which has 4 to 18 carbon atoms, preferably 4 to 10 carbon atoms, in the alkyl radicals. Polyvinyl acetate is particularly suitable. The viscosity of the 20 percent strength by weight solution of the vinyl ester homopolymer in ethyl acetate is within the range from 4 to 250 mPa·s, preferably 30 to 150 mPa·s (determined in a Höppler viscometer at a temperature of 20° C. by the method of DIN 53,015); its acid number is appropriately 0.2 to 2.5 mg of KOH/g, preferably 0.2 to 1.0 mg of KOH/g (determined by the method of DIN 53,402). The viscosity of the 20 percent strength by weight solution of the vinyl ester copolymer in ethyl acetate is within the range from 3 to 30 mPa·s, preferably 5 to 20 mPa·s (determined as indicated above). The component (b) can also be a mixture of different polymers.

The component (c) is an inorganic filler, preferably a carbonate or an oxide or an inert mineral. Examples of suitable fillers are graphite, ground shale, chalk, mica and vermiculite. A particularly advantageous filler is one which constitutes a mixture of different materials, preferably a mixture of chalk and a further filler; the ratio by weight in this case is 2:1 to 1:2.

The component (d) is an epoxide resin having an average epoxide equivalent weight of 100 to 5,000 g, preferably 100 to 500 g (the quantity of resin containing 1 mole of epoxide groups). The viscosity of the epoxide resin is within the range from 0.1 to 35 Pa·s, preferably 0.5 to 15 Pa·s (determined at a temperature of 25° C. in a Höppler viscometer by the method of DIN 53,015). Examples of suitable epoxide resins are the known glycidyl ethers of bisphenols, that is to say reaction products of bisphenols, for example bis-(4-hydroxyphenyl)-methane or 2,2-bis-(4-hydroxyphenyl)-propane, with epichlorohydrin. Depending on the molar ratio of the components involved, these epoxide resins exhibit a liquid, pasty or solid consistency.

The component (e) is an alcoholate of a bivalent, trivalent or tetravalent metal, in which the alcohol component is preferably a monohydric or dihydric alkanol having 1 to 6 carbon atoms, in particular 2 to 4 carbon atoms. Alcoholates of magnesium, calcium and, preferably, aluminum with ethanol, propanol, butanol, ethylene glycol, 1,3-propanediol and 1,4-butanediol are particularly suitable.

The synthetic resin composition according to the invention is prepared by mixing the components involved in each particular case homogeneously and vigorously at at temperature of 150° to 180° C., preferably 160° to 170° C. A time of 10 to 30 minutes, preferably 15 to 25 minutes, is sufficient for the preparation of the mixture. A preferred mixing device is a device which ensures homogeneous thorough mixing of the various constituents of the mixture; a kneader is particularly suitable for this purpose. The mixture is appropriately discharged from the mixing device in the form of particles having an average particle diameter of 1 to 10 mm, preferably 2 to 5 mm. A granulated form is preferable in this respect.

Sheets are produced from the synthetic resin composition according to the invention by calendering or extrusion using a flat-film die (fishtail-die). If the sheet is used as so-called lightweight insulating sheet, its thickness is generally 1 to 5 mm, preferably 1.5 to 4 mm. The sheet is particularly distinguished by the fact that it has a vibration-damping action at frequencies of 100 and 1,000 Hertz in the temperature range from not higher than −20° C. to not lower than +40° C.

The damping behavior of the sheet according to the invention is tested by determining the loss factor in the bending vibration test specified in DIN 53,440. The specimen used in this test is composed of a steel sheet and the sheet to be tested, which is attached to the steel sheet, preferably by gluing. The sheet has a thickness of 1.5 to 2.5 mm, whereas the steel sheet is 1.0 mm thick; the coating factor, that is to say the quotient, multiplied by 100, of the mass of sheet and the mass of sheet metal, is then 40 to 60 percent, preferably not more than 50 percent. The determination is carried out in each case at frequencies of 100 Hertz and 1,000 Hertz. The damping behavior can be assessed as good if the width of the temperature range at a loss factor of at least 0.05 covers a range of at least 60° C., the lower temperature limit being not higher than −20° C.

The examples below serve to illustrate the invention in greater detail. Percentage and ratio data relate in each case to weight.

EXAMPLE 1

80 g of a copolymer (a) which is composed of 62% of acrylic acid 2-ethylhexylester, 23% of acrylic acid butylester, 8% of methacrylic acid methylester, 6% of acrylamide and 1% of acrylic acid and which has a second order transition temperature of −47° C. and a melt viscosity (at 180° C.) of 25 Pa·s, and 40 g of polyvinyl acetate (b), a 20 percent strength solution of which in ethyl acetate exhibits a viscosity of 130 mPa·s and which has an acid number of 0.6 mg of KOH/g, are kneaded together to form a homogeneous mixture for a period of 30 minutes at an internal temperature of 170° C. in a commercially available kneader which can be heated and has a capacity of 0.5 l. 223 g of a 1:1 ground shale/chalk mixture (c) are added to this mixture in the course of 10 minutes while kneading continuously and the resulting synthetic resin composition is subsequently kneaded for a further 30 minutes.

The damping behavior of a sheet made of the abovementioned synthetic resin composition is investigated by the bending vibration test specified in DIN 53,440. The sheet required for this purpose is produced by compressing the synthetic resin composition at a temperature of 160° C. between two separating sheets in a heated press; it has a thickness of 2.5 mm. The specimen consists of a steel sheet 1 mm thick, which is attached to the abovementioned sheet by gluing. At a coating factor of 56.9%, the test gives a loss factor of at least 0.05 over a temperature range from −30° C. to 40° C. at a frequency of 100 Kz and from −30° C. to 50° C. at a frequency of 1,000 Hz.

EXAMPLE 2

Example 1 is repeated subject to the condition that the quantity of component (a) employed is 60 g and the quantity of component (b) employed is 60 g.

At a coating factor of 56.9%, the test gives a loss factor of at least 0.05 over a temperature range from −35° C. to 65° C. at a frequency of 100 Hz and from −25° C. to 65° C. at a frequency of 1,000 Hz.

EXAMPLE 3

Example 1 is repeated, subject to the condition that the quantity of component (a) employed is 48 g and the quantity of component (b) employed is 72 g.

At a coating factor of 53.8%, the test gives a loss factor of at least 0.05 over a temperature range from −25° C. to 70° C. at a frequency of 100 Hz and from −20° C. to 75° C. at a frequency of 1.000 Hz.

EXAMPLE 4

Example 1 is repeated, subject to the condition that the quantity of component (a) and of component (b) used is 60 g in each case and the quantity of component (c) used is 120 g.

At a coating factor of 46.2%, the test gives a loss factor of at least 0.05 over a temperature range from −25° C. to 40° C. at a frequency of 100 Hz and from −25° C. to 45° C. at a frequency of 1,000 Hz.

EXAMPLE 5

Example 1 is repeated, subject to the condition that the quantity of component (a) and of component (b) employed is 60 g in each case and the quantity of component (c) employed is 180 g.

At a coating factor of 54.8%, the test gives a loss factor of at least 0.05 over a temperature range from −25° C. to 50° C. at a frequency of 100 Hz and from −25° C. to 60° C. at a frequency of 1,000 Hz.

EXAMPLE 6

Example 1 is repeated, subject to the condition that the quantity of component (a) and of component (b) employed is 60 g in each case and the quantity of component (c) employed is 280 g.

At a coating factor of 58.4%, the test gives a loss factor of at least 0.05 over a temperature range from −25° C. to 75° C. at a frequency of 100 Hz and from −25° C. to 75° C. at a frequency of 1,000 Hz.

EXAMPLE 7

Example 1 is repeated, subject to the condition that the quantity of component (a) employed is 40 g, the quantity of component (b) employed is 80 g and the quantity of component (c) employed is 280 g; the component (b) is composed in this case of a 1:1 mixture of polyvinyl acetate, a 20 percent strength solution of which in ethyl acetate exhibits a viscosity of 130 mPa·s and which has an acid number of 0.6 mg of KOH/g, and a copolymer formed from 70% of vinyl acetate and 30% of maleic acid di-n-butylester, 20 percent strength solution of which in methyl acetate exhibits a viscosity of 5 to 20 mPa·s.

At a coating factor of 55.5%, the test gives a loss factor of at least 0.05 over a temperature range from −25° C. to 65° C. at a frequency of 100 Hz and from −20° C. to 75° C. at a frequency of 1,000 Hz.

EXAMPLE 8

Example 1 is repeated, subject to the condition that the quantity of component (a) and of component (b) used is 60 g in each case and the quantity of component (c) used is 360 g. Furthermore, the component (c) is employed as a mixture with 1.2 g of a liquid epoxide resin (d) which has an average epoxide equivalent weight of 180 to 192 g and a viscosity of 9 to 12 Pa·s. At a coating factor of 46.9%, the test gives a loss factor of at least 0.05 over a temperature range from −25° C. to 65° C. at a frequency of 100 Hz and from −25° C. to 70° C. at a frequency of 1,000 Hz.

EXAMPLE 9

Example 1 is repeated, subject to the condition that the quantity of component (a) and of component (b) used is 60 g in each case and the quantity of component (c) used is 360 g. Furthermore, the component (c) is employed as a mixture with 0.3 g of aluminum butanediolate (e).

At a coating factor of 46.9%, the test gives a loss factor of at least 0.05 over a temperature range from −25° C. to 75° C. at a frequency of 100 Hz and from −20° C. to 70° C. at a frequency of 1,000 Hz.

We claim:

1. A synthetic resin composition which comprises
    (a) 10 to 90 percent by weight of a copolymer composed of at least one acrylic acid alkyl ester having 4 to 10 carbon atoms in the alkyl radical, a methacrylic acid alkyl ester having 1, 2 or 3 carbon atoms in the alkyl radical, an amide of an unsaturated monocarboxylic acid having 3, 4 or 5 carbon atoms, and an unsaturated monocarboxylic acid having 3, 4 or 5 carbon atoms,
    (b) 90 to 10 percent by weight of at least one polymer of a vinyl ester having 4, 5 or 6 carbon atoms,
    (c) 0 to 80 percent by weight of an inorganic filler,
    (d) 0 to 10 percent by weight of an epoxide resin having an average epoxide equivalent weight of 100 to 5,000 and
    (e) 0 to 10 percent by weight of an alcoholate of a bivalent, trivalent or tetravalent metal, the quantity of the components (c), (d) and (e) being in each case related to the total of the components (a)+(b)+(c).

2. A synthetic resin composition as claimed in claim 1 wherein the copolymer (a) has been prepared by polymerising a mixture composed of 70 to 85 percent by weight of at least one acrylic acid alkyl ester, 5 to 20 percent by weight of a methacrylic acid ester, 3 to 10 percent by weight of an amide of an unsaturated monocarboxylic acid and 0 to 5 percent by weight of an unsaturated monocarboxylic acid.

3. A synthetic resin composition as claimed in claim 1, wherein the copolymer (a) has a second order transition temperature of −50° to −10° C.

4. A synthetic resin composition as claimed in claim 1, wherein the polymer (b) has a second order transition temperature of 5° to 50° C.

5. A synthetic resin composition as claimed in claim 1, wherein the filler (c) is an inert mineral.

6. A process for the preparation of a synthetic resin composition, which comprises thoroughly mixing together, at a temperature of 150° to 180° C. for a period of 10 to 30 minutes in a kneader, (a) 10 to 90 parts by weight of a copolymer composed of at least one acrylic alkyl ester having 4 to 10 carbon atoms in the alkyl radical, a methacrylic acid alkyl ester having 1, 2 or 3 carbon atoms in the alkyl radical, an amide of an unsaturated monocarboxylic acid having 3, 4 or 5 carbon atoms, and an unsaturated monocarboxylic acid having 3, 4 or 5 carbom atons, with (b) 90 to 10 parts by weight of at least one polymer of a vinyl ester having 4, 5 or 6 carbon atoms, (c) 0 to 80 parts by weight of an inorganic filler, (d) 0 to 10 parts by weight of an epoxide resin having an average epoxide equivalent weight of 100 to 5,000 and (e) 0 to 10 parts by weight of an alcoholate of a bivalent, trivalent or tetravalent metal, the total of the components (a)+(b)+(c) amounting to 100 parts by weight, and then discharging the mixture in the form of particles having an average particle diameter of 1 to 10 mm.

7. A process for the production of a vibration-damping sheet, which comprises calendering a synthetic resin composition as claimed in claim 1 or extruding this composition through a flat-film die.

8. Vibration-damping sheet produced from the synthetic resin composition as claimed in claim 1.

* * * * *